Figure 1:
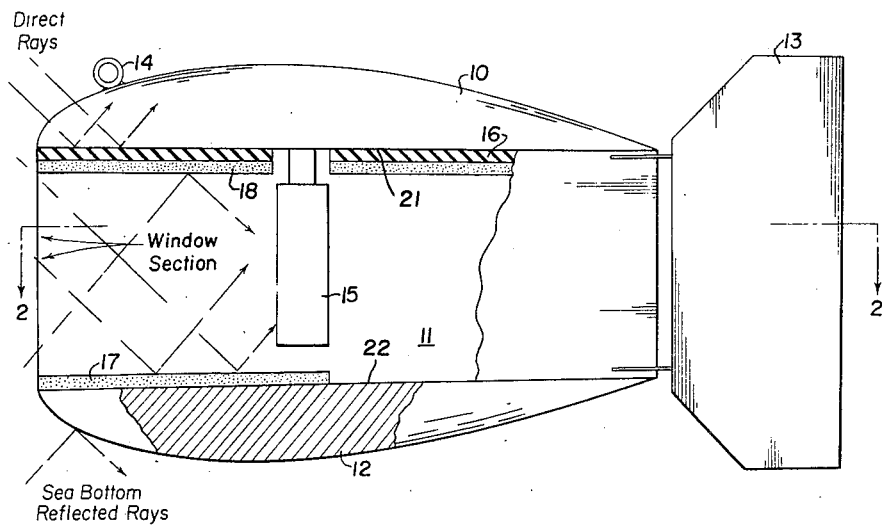

Dec. 21, 1965     F. A. A. FERGUSSON ETAL     3,224,405
TOWED BODY FOR VARIABLE DEPTH SONAR
Filed March 27, 1961

Reflecting
Absorbing

| United States Patent Office | 3,224,405
Patented Dec. 21, 1965 |
|---|---|

3,224,405
TOWED BODY FOR VARIABLE DEPTH SONAR
Fergus Alexander Adair Fergusson, Cedric Robert Mann, and James Gordon Retallack, all of Dartmouth, Nova Scotia, Canada, assignors to Her Majesty the Queen in right of Canada as represented by the Minister of National Defence
Filed Mar. 27, 1961, Ser. No. 98,546
Claims priority, application Canada, Aug. 31, 1960, 806,205
4 Claims. (Cl. 114—235)

The present invention relates to a towed body for housing a variable depth sonar transducer.

In a variable depth sonar apparatus the sonar transducer is towed by means of a cable, below the surface vessel. Since these transducers are comparatively large and not of a suitable shape for towing it is necessary to house them in a body which provides a minimum of transmission loss for the sonar transducer and at the same time has a smooth non-turbulent shape. The requirements of such a body may be basically recited as follows:

(1) The body must be streamlined to reduce drag and to prevent turbulent noise at operational towing speeds;
(2) Space must be available in the body for instrumentation such as the control apparatus associated with the transducer;
(3) The body must be acoustically transparent, at least in the section containing the transducer.

Prior bodies for variable depth sonar transducers have been constructed with a skin formed either of thin metal or thick rubber reinforced with a metal framework of vertical and horizontal members to support the stresses. This framework causes transmission losses and distorts the signals transmitted or received by the transducer.

The present invention overcomes the difficulties of the prior devices by providing a towed body for housing a variable depth sonar transducer having a upper dome, an under dome and an acoustically transparent window section consisting of a relatively thick metal skin serving as the principal strength bearing member with a small number of supporting ribs, the window section being located between the upper dome and underdome. The upper dome and underdome are relatively non-transparent to the radiations from the sonar transducer and the window section provides a close match to the radiation resistance of the transducer. At the same time the window section in accordance with the present invention introduces a minimum of distortion in the radiation pattern of the transducer.

The underdome of the body may be provided with ballast sufficient to ensure the negative buoyancy of the body. We have found that by forming the window section of the body of a skin of heavy gauge aluminum sheet and providing it with a plurality of vertically extending ribs having a T-shape cross section that a closer impedance match to sea water is obtained thus minimizing distortions of the transducer pattern. The ribs are fastened to the skin of the window section with the top of the T adjacent the skin and with the leg of the T pointing toward the transducer, to present the minimum of surface area of the leg to the transducer. Thus reflections from the ribs are reduced to a minimum and the radiation pattern of the transducer is not substantially altered. This window has the added advantages that it is structurally easy to work, and being nonmagnetic, does not affect the heading compass mounted in the body.

Figure 2:
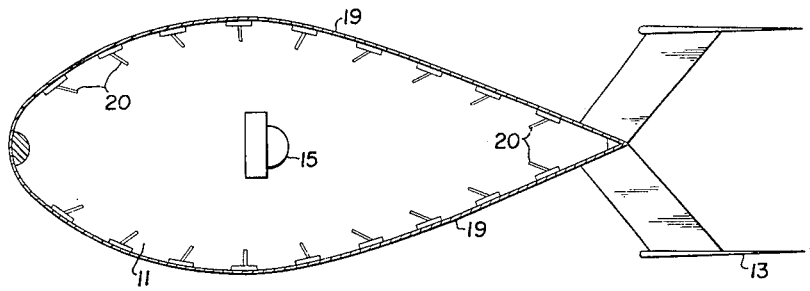

In drawings which illustrate an embodiment of the invention:

FIGURE 1 is a vertical section through a towed body constructed in accordance with the invention, and FIGURE 2 is a horizontal section on the line 2—2 of FIGURE 1.

As shown in FIGURE 1, a towed body for housing a variable depth sonar transducer comprises an upper dome 10, a window section 11 and an underdome 12. The underdome 12 is filled with ballast to ensure that the towed body has sufficient negative buoyancy for high speed towing. An empennage 13 is coupled to the rear of the body to stabilize the motion of the body. The tow point 14 is also provided on the upper dome for connection to a tow cable.

As shown in FIGURE 1 a tranducer 15 is housed within the window section and is free to rotate through 360°.

In a towed sonar, the body may also house a baffle to shield the transducer from masking background noise. The major source of this noise is the towing ship. The shape of the body constructed in accordance with the invention is particularly suitable for providing such a baffle since it provides space for an overhead baffle extending well ahead of the transducer. The location of the baffling materials is shown in FIGURE 1. A reflector baffle 16 is situated at the upper face of the window section where the window section is joined to the upper dome on the lower surface 21 thereof. This effectively shields the transducer against direct radiation from the ship's propellers and engines. The ballast in the underdome 12 serves as a baffle against ship's noise reflected from the sea bottom while absorber 17 at the upper surface 22 of the underdome reduces the level of direct radiation from the ship's propellers and engines reflected from the upper surface of the underdome and reaching the transducer 15. A layer of sound absorbing material 18 is provided beneath the reflecting layer 16 and the undersurface 21 of the upper dome.

The sound reflecting material consists of a perforated rubber sheet fixed between two solid sheets which does not collapse under hydrostatic pressure. A suitable sound absorbing material is aluminum loaded rubber.

As is shown in FIGURE 2 the window section 11 consists of a heavy gauge aluminum skin 19 to which a plurality of ribs 20 are fixed. These ribs serve to strengthen the skin and extend from the upper dome to the underdome. The ribs are fixed to the skin with the top of the T adjacent to the skin and with the leg of the T bent to face the transducer. In this way the reflected radiation from the sides of the T is minimized and the disturbance of the transducer beam is reduced. These ribs tend to reduce, by scattering the secondary lobes caused by the interial specular reflection of the main beam at the skin.

We claim:

1. A towed body for housing a variable depth sonar transducer comprising a sound transparent window section, an upper dome, an underdome and an empennage, said upper dome being provided with a tow point for connection with a tow cable, said towed body being of streamlined cross section and said underdome including ballast sufficient to increase the negative buoyancy of said towed body, and said window section being formed of a skin of heavy gauge aluminum sheet and is provided with a plurality of vertically extending ribs having a T-shaped cross section.

2. A towed body according to claim 1 wherein said ribs are fastened to said skin with the top of the T adjacent the skin, the leg of the T of each rib being positioned to present a minimum of surface area to said transducer.

3. A towed body according to claim 1 wherein said underdome includes an upper surface, at least a portion of which is provided with a sound absorbing layer, and wherein said upper dome includes a lower surface, at least a portion of which is provided with a sound reflecting baffle, at least a portion of said baffle having an absorbing layer affixed thereon.

4. A towed body for housing a variable depth sonar transducer comprising a sound transparent window section, an upper dome, an underdome and an empennage, said upper dome being provided with a tow point for connection with a tow cable, said towed body being of streamlined cross section and said underdome including ballast sufficient to increase the negative buoyancy of said towed body, and said underdome including an upper surface, at least a portion of which is provided with a sound absorbing layer, and said upper dome including a lower surface, at least a portion of which is provided with a sound reflecting baffle, at least a portion of said baffle having an absorbing layer affixed thereon.

References Cited by the Examiner

UNITED STATES PATENTS

| | | | |
|---|---|---|---|
| 2,371,404 | 3/1945 | Mumford | 114—235 X |
| 2,444,911 | 7/1948 | Benioff | 181—0.5 |
| 2,465,993 | 4/1949 | Beechlyn | 181—0.5 X |
| 2,472,107 | 6/1949 | Hayes et al. | 181—0.5 |
| 2,610,240 | 9/1952 | Pottorf | 340—7 |
| 2,672,945 | 3/1954 | Harris et al. | 181—0.5 |
| 2,708,742 | 5/1955 | Harris | 340—7 |
| 2,958,488 | 11/1960 | Wilcoxon | 114—235 X |

MILTON BUCHLER, *Primary Examiner.*

BENJAMIN A. BORCHELT, *Examiner.*